No. 734,107. PATENTED JULY 21, 1903.
F. J. THORING.
COUPLING FOR DRILL RODS, LINE SHAFTS, OR OTHER DEVICES.
APPLICATION FILED OCT. 23, 1902.
NO MODEL.
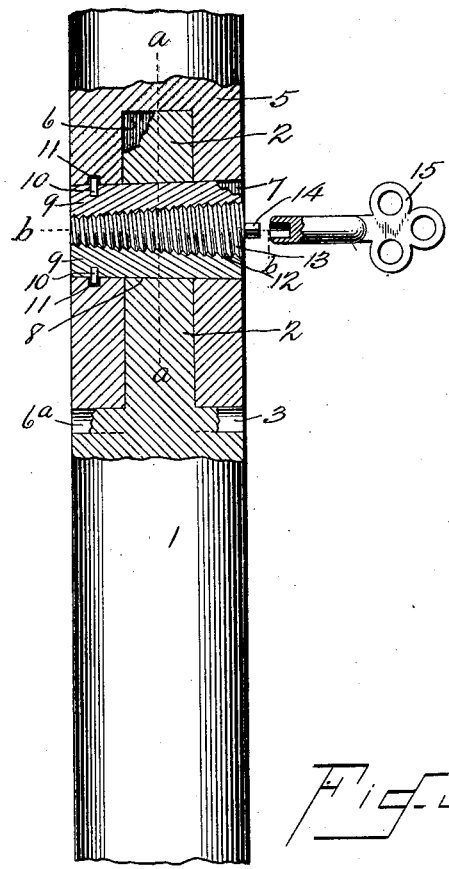
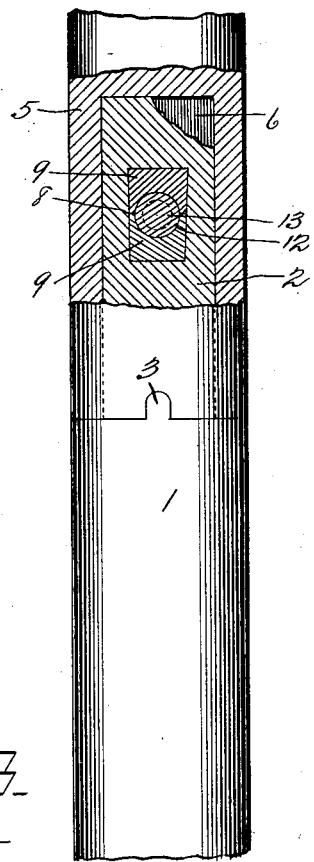
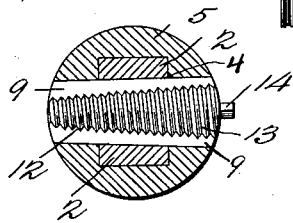
F. J. Thoring, Inventor No. 734,107.

Patented July 21, 1903.

UNITED STATES PATENT OFFICE.

FREDRICK J. THORING, OF LIMA, OHIO.

COUPLING FOR DRILL-RODS, LINE-SHAFTS, OR OTHER DEVICES.

SPECIFICATION forming part of Letters Patent No. 734,107, dated July 21, 1903.

Application filed October 23, 1902. Serial No. 128,453. (No model.)

*To all whom it may concern:*

Be it known that I, FREDRICK J. THORING, a citizen of the United States, residing at Lima, in the county of Allen and State of Ohio, have invented certain new and useful Improvements in Couplings for Drill-Rods, Line-Shafts, or other Devices; and I do declare the following to be a full, clear, and exact description of the invention, such as will enable others skilled in the art to which it appertains to make and use the same.

My invention is an improved coupling for drill-rods, line-shafts, and other devices; and it consists in the peculiar construction and combination of devices hereinafter fully described and claimed.

The object of my invention is to provide an efficient coupling for drill-rods, line-shafts, and other devices which is adapted for coupling two members thereof together and keeping them permanently in line with each other when coupled, a further object of my invention being to provide improved means for taking up the wear of the coupled members to prevent the coupling from becoming loose.

In the accompanying drawings, Figure 1 is partly an elevation and partly a longitudinal sectional view of a coupling embodying my improvements. Fig. 2 is a similar view partly in section on the line $a\,a$ of Fig. 1, and Fig. 3 is a transverse section taken on the line $b\,b$ of Fig. 1.

In the embodiment of my invention here shown the member 1 of the coupling is provided at one end with a centrally-disposed projecting coupling-stem 2, which is angular in cross-section. At the base of this coupling-stem are radially-disposed engaging tongues 3. The stem is provided at a suitable distance from its outer or upper end with a transverse opening 4, which is here shown as angular in cross-section. A member 5 of the coupling is provided with a longitudinal bore 6, which corresponds in size and shape with the coupling-stem 2 and is adapted to receive the latter, whereby the two members of the coupling may be telescopically fitted together. At the end of the member 5 are notches $6^a$ to receive the engaging tongues or flanges 3. The said notches, flanges, or tongues, stem 2, and bore 6 coact to prevent either of the members of the coupling from turning axially to any extent with relation to the other. The member 5 is also provided in opposite sides with openings 7, which when the said members 1 5 are fitted together coincide with the opening 4 of the coupling-stem 2. In the said openings 4 7 is fitted a transversely-disposed locking member 8, which is here shown as a key longitudinally divided into two sections or members 9. The said members 9 are provided on their outer sides at their inner ends with studs 10, which engage countersinks 11 in the upper and lower ends of one of the openings 7. Between the opposing sides of the members of the split key 8 is formed a screw-threaded tapered bore 12. In order to expand the locking member 8 laterally to clamp the same firmly in the alined openings of the coupled members, I provide a tapered wedge-screw 13, which is adapted to be screwed in the correspondingly-tapered threaded opening between the members of the said locking-key. This wedge-screw is here shown as provided at its outer end with an angular stud 14, which is adapted to be turned by a suitable key-wrench 15.

From the foregoing description, taken in connection with the accompanying drawings, the construction, operation, and advantages of my invention will be readily apparent, it is thought, without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a coupling of the class described, a pair of telescoping members having coincident transverse openings, in combination with the laterally-expansible locking member in said openings, and means to expand said member, substantially as described.

2. In a coupling of the class described, a pair of telescoping members having coincident transverse openings, in combination with a locking member in said openings having a pair of longitudinal members, and means to expand said members laterally and thereby clamp said locking member in said openings, substantially as described.

3. In a coupling of the class described, a pair of telescoping members having coincident transverse openings, in combination with a locking-key in said openings, said key comprising a pair of longitudinal sections having a tapered threaded bore in their opposing sides, and a wedge-screw in said bore to expand said locking-key laterally, substantially as described.

In testimony whereof I have hereunto set my hand in presence of two subscribing witnesses.

FREDRICK J. THORING.

Witnesses:
   JAS. GORMAN,
   M. J. SULLIVAN.